Patented July 12, 1949

2,475,917

UNITED STATES PATENT OFFICE 2,475,917

MUSSEL PROVITAMIN D AND PROCESS

Hans R. Rosenberg, Wilmington, Del., assignor to E. I. du Pont de Nemours & Company, Wilmington, Del., a corporation of Delaware No Drawing. Application June 25, 1945, Serial No. 601,549

3 Claims. (Cl. 260—397.2)

This invention relates to a new class of sterol derivatives and more particularly refers to a class of provitamins D and vitamins D which is particularly adapted for the prevention or cure of rickets in poultry and processes for the production of said materials.

The history of the discovery of vitamins D has been described at length in various publications such as, for example, in Rosenberg's "Chemistry and Physiology of the Vitamins." This invention is particularly related to only those forms of vitamin D which are effective in birds. From a practical point of view, this interest concentrates on poultry and among these particularly, chickens and turkeys. Of the many forms of vitamin D which have been known prior to this application, there are only a few which exhibit vitamin D activity on these birds. Prior to the discovery of synthetic methods for the preparation of chicken-active vitamins D the only source of such vitamin was fish liver oil. For the purpose of standardizing and defining the efficacy of vitamins D on chickens, the relative activity as exhibited by the vitamin D present in U. S. P. Reference cod liver oil will be designated as 100% chicken activity.

The first synthetic vitamin D was produced by activation of ergosterol. This vitamin is usually referred to as vitamin $D_2$ and is also called viosterol or calciferol. This vitamin D proved to be essentially non-active for birds. The first man-made chicken-active vitamin D was discovered by Waddell who showed, in 1934, that by irradiation of the cholesterol fraction obtained from the spinal cord of cattle and containing small amounts of provitamin D, a highly potent vitamin D is obtained. This observation, however, proved to be of little commercial value since the amount of provitamin D present in cholesterol is of a very small order of magnitude. Considerable advance in the art has been made by Windaus who in 1935 published a procedure for the synthesis of a provitamin D, 7-dehydro-cholesterol, which upon activation, yields a chicken-active vitamin D. This provitamin D was obtained from cholesterol by a number of chemical steps. This method, while it yielded 7-dehydro-cholesterol, was subject to many disadvantages, especially on a large scale commercial production. As a result, a considerable number of improvements, modifications and new methods of synthesizing 7-dehydro-cholesterol from cholesterol were invented. The vitamin D obtained by activation of the provitamin, 7-dehydro-cholesterol, proved to be as chicken-active as the U. S. P. Reference cod liver oil. Recent indications are that the activity of this synthetic vitamin D, which is also called vitamin $D_3$, may be somewhat greater than the U. S. P. Reference cod liver oil.

Parallel with this development of synthetic methods of preparing chicken-active vitamin D came the discovery of easily and abundantly available natural provitamins D which, upon activation, yield chicken-active vitamins D. Thus, while the irradiation of cholesterol from the spinal cord of cattle as practiced by Waddell yielded only small amounts of vitamin D, it was found by Boer, Niekerk, Reerink and Van Wijk (U. S. Patent 2,163,659) that certain invertebrata contain relatively high amounts of provitamins D which can be converted into chicken-active vitamins D. Further investigation of these new natural sources indicated that the effectiveness of the vitamin D obtained may vary considerably.

The production of provitamin D from natural sources is subject to the disadvantage that tremendous quantities of inactivatable sterols and other materials must be processed and ultimately separated from the provitamin D. These inactivatable materials were of no practical value and had to be discarded.

In the foregoing processes for synthesizing provitamin D from cholesterol and other sterols a somewhat similar problem was met. In this case, however, the other materials with which the cholesterol was associated had to be carefully separated from the cholesterol before it was subjected to the reactions whereby ultimately it was converted to 7-dehydro-cholesterol. Needless to say, the separation of these impurities was an expensive and time-consuming operation, since they were present in large quantities. Nevertheless, such separation was generally conceded to be essential, as otherwise the described processes would be incapable of producing the desired 7-dehydro-cholesterol due to what was considered to be undesirable side reactions, by-products, etc.

It is, therefore, apparent that while tremendous strides have been made in the development of new sources of provitamin D, both natural and synthetic, these processes are subject to the disadvantages mentioned. Any discovery which would overcome these disadvantages would, therefore, further advance this art and be of marked benefit to the public.

It is an object of this invention to overcome the foregoing and related disadvantages of the prior art. A further object is to produce a new class of provitamins D and vitamins D by means of a process which does not require meticulous purification of the sterol to be acted upon. A still further object is to produce a new class of provitamins D and vitamins D by means of a process which acts upon a mixture of sterols which heretofore was considered to be of no practical value. An additional object is to improve upon prior art processes for the production of provitamins D and vitamins D, thereby reducing their cost. Further objects will become apparent from a consideration of the following description and claims.

These objects are attained in accordance with the present invention wherein mixtures of inactivatable sterols, particularly those substantially free from cholesterol and other sterols known to yield vitamins D, are oxidized and the resulting oxidation products are dehydrated to produce provitamins D. The so-produced provitamins are then antirachitically activated to produce vitamin D. In a more restricted sense, this invention is concerned with the oxidation of the inactivatable sterol mixture naturally occurring in invertebrate animals, either before or after separation of the naturally occurring provitamin D content thereof, dehydration of the resulting oxidation products and antirachitic activation of the so-produced provitamin D. In its preferred embodiment the inactivatable sterol mixtures naturally occurring in mussels, and particularly mussels of the species *Modiolus demissus* (Dillwyn), are treated as aforesaid to produce new classes of provitamins D and vitamins D.

According to this invention the sterol fraction from an animal source is employed as a starting material. While the preferred group of animals includes the invertebrata there are some animal sources of the vertebrate family which are particularly useful for this invention. An excellent survey of the various animals which may serve as a source of sterols for this invention is given in the book by H. S. Pratt entitled "Manual of Common Invertebrate Animals." There are obviously many sources which can be used in this invention and which originate from vertebrates. Particularly useful among these is wool grease, due to it relatively low cost. It is well known in the art that the sterol fraction obtained from wool grease contains a mixture of various compounds some of which are sterols proper, while others belong to the tri-terpene family. This mixture also contains a certain amount of a provitamin D. A number of experiments have been performed with this material and with the sterol fractions from many invertebrate animals. Among these are the sterol fractions obtained from mussels of the species *Modiolus demissus* (Dillwyn) and *Mytilus edulis*, oysters, periwinkles, and many others. In every case it has been found that the sterol fraction contains a certain amount of provitamin D, in addition to a certain amount of of a sterol or a sterol mixture which can be converted into provitamin D by chemical synthesis. In addition, it has been found that all these sources contain compounds in their sterol fraction which do not lend themselves to conversion into vitamin D by any one of the methods which are known to yield vitamin D from either a provitamin D or a sterol of the type of cholesterol. One phase of this invention includes then the use of such sterol mixtures as starting materials for the production of vitamin D. This process may be carried out by a combination of different steps. The natural provitamin D occurring in these mixtures is usually present in relatively small amounts and, so far as known, a material has never been found which contains more than 50% of provitamin D. This provitamin D should advisably be separated according to the present invention before the other sterols are converted into a provitamin D by chemical synthesis. While it is possible to carry out such a separation after first chemically transforming the provitamin by means of oxidation, by halogenation, and by a number of other procedures, it is more economical to separate the provitamins D from the other sterols by reacting it with compounds such as maleic anhydride, etc., from which the provitamin can be recovered by thermal decomposition. According to a preferred method, however, the sterols are separated from the provitamin by activation of the natural provitamin D to vitamin D. This activation may be carried out by any one of the known procedures such as activation by ultra-violet light, by cathode rays, as such or in the presence of catalysts, canal rays, $\alpha$-, $\beta$- and gamma rays of radio-active elements and radium emanation, X-rays, corpuscular rays, electrons of high frequency, alternating current of high frequency, electrode and/or electrodeless discharges, etc. This activation may be carried out in the dry state, in vapor phase or in solution. For the purpose of maximum yields it is well to activate at any one operation only approximately 40–50% of the provitamin D present and to recover the unchanged provitamin D together with the sterol fraction and to separate from these the vitamin D formed. The recovered material is then again subjected to an activation procedure under similar conditions as the first one. Thus, after a number of successive treatments the sterol fraction will have been exhaustively activated. There will come a point when there are still traces of provitamin present in the sterol mixture, but where it will be commercially impracticable to attempt further conversion to vitamin D because of the relatively high cost compared with the relatively small gain in vitamin D.

After the provitamin D has been removed from the sterol fraction by any one of the procedures described in the previous paragraph, there remains a mixture of sterols, part of which can be converted into useful vitamins D by chemical procedures. While according to the prior art only pure sterols have been used for the conversion of sterols into 7-dehydro-sterols, it has now been discovered that it is equally feasible and in most cases even more advantageous to use the crude sterol mixtures. It is well known that cholesterol is obtained in a degree of high purity by isolating the sterol fraction from, for example, the spinal cord of cattle. On the other hand, it is also known that the sterol fraction from certain other sources such as, for example, from wool grease contains besides cholesterol, a number of other compounds which are either sterols or sterol-like materials such as triterpenes. It is a well known fact that it is extremely difficult and very costly to separate a pure or nearly pure cholesterol from such a mixture of compounds. According to this invention it is not necessary to understake such a separation of the sterols which can be converted by chemical synthesis into provitamin D from those materials which can not be converted into such materials. It has been found that it is possible to take the mixture of sterols and convert the sterols proper in this mixture into vitamin D while simultaneously effecting a separation from the unwanted material. This separation may be carried out in any one of the various steps involved in the conversion of the sterol to the vitamin D and depends largely upon the particular method used.

Principally, there are three different reaction types for the conversion of a sterol into a provitamin D, all depending upon oxidation followed by dehydration. The end effect is the same in all three cases. This end effect comprises the removal of two hydrogens from the 7- and 8-position of the sterol molecule to obtain a 7-dehydrosterol which is a provitamin D. The first of these procedures has been discovered by Waddell and consists of a simple oxidation procedure which eliminates the two hydrogens in one operation (U. S. Patents 2,056,992 and 2,028,364). This procedure has been improved by other inventors, notably Milas and Heggie (U. S. Patent 2,260,-085). The second procedure consists of converting the sterol into a 7-keto-sterol compound, reducing the keto group into a hydroxyl group and effecting a dehydration procedure by any one of a number of different procedures. The principle of this procedure has been laid down by Windaus in his U. S. Patents 2,098,984 and 2,098,985. Several of the improvements, modifications and alternative procedures are described in U. S. Patents 2,209,934, 2,215,727, 2,255,815, 2,369,918 and in the application S. N. 459,303, now Patent No. 2,376,817.

The third procedure consists of an oxidation of the sterol compound directly into a 7-hydroxysterol compound followed by a dehydration procedure. This process is covered in application S. N. 415,490 (now U. S. Patent 2,386,635).

Any one of these methods may be used for the preparation of 7-dehydro-sterols from the sterols present in the mixture as described above. Separation from those materials which do not lend themselves to conversion into provitamin D can be effected during this chemical conversion procedure or during the activation of the provitamin D to the vitamin D.

When using the sterol mixture from invertebrate animals and going through the series of steps as described above, one starts with a sterol mixture consisting of a certain amount of naturally-occurring provitamin D, some naturally-occurring sterols and some other sterol-like material. The naturally-occurring provitamin is converted into vitamin D as described above, for example, by exhaustive irradiation. The remaining mixture of sterols and sterol-like materials is then subjected to any one of the above-outlined procedures for the conversion of sterols to 7-dehydro-sterols. When carrying out this procedure, for example, according to the principle as established by Windaus and converting the sterol into a 7-keto-sterol compound, it has been found that it is possible to separate the 7-keto-sterol compound from those materials which cannot be converted into provitamin D. This operation may be carried out by a single crystallization from a suitable solvent such as alcohol, "Skellysolve," ethyl-acetate, etc. On the other hand, when the chemical conversion of sterol to provitamin D is carried out by any one of the other two procedures the material which cannot be converted, or was not converted into provitamin D is carried through, at least to a certain extent, and is present in the final provitamin D. The net result is a mixture of compounds containing provitamin D. This mixture is then subjected to antirachitic activation and separation is effected by crystallizing out the sterol-like material together with unconverted provitamin D and in certain cases unconverted sterols, leaving the vitamin D in the mother liquors.

It is known that cholesterol occurs not only in vertebrate animals but also in some invertebrates. Up to the present time, it has been assumed that cholesterol is the only sterol of animal origin which can be converted into a 7-dehydro-sterol which yields a chicken-active vitamin D after antirachitic activation. It might, therefore, be assumed that the excellent results obtained in accordance with this invention are dependent upon the cholesterol content of the initial materials. Such an assumption would be erroneous, however, because the physical constants of the final products are quite unlike those for 7-dehydro-cholesterol or its irradiation product. It appears from the present invention that invertebrate animals contain a series of sterol or sterol-like compounds which have not been isolated or characterized in the past and which are very difficult to isolate in the pure state, but which can be readily converted to new provitamins D and vitamins D. It is impossible to state at this time how many different compounds of this type occur in invertebrata, but the results of this investigation indicate that there is a multitude of such compounds present.

This invention is particularly concerned with the sterol or sterol-like mixture which occurs in the mussel of the species *Modiolus demissus* (Dillwyn). These sterols probably do not contain any cholesterol, but they can be converted by any one of the above-described three principal procedures to a new synthetic provitamin D. This provitamin D after activation yields a new chicken-active vitamin D. The activity of this vitamin is appreciably greater than that of the U. S. P. Reference cod liver oil. A rough estimate indicates that this vitamin has an activity corresponding to approximately 120% of that of the U. S. P. Reference cod liver oil. Detailed studies of the chemical and physical properties of the provitamin D obtained indicates that this provitamin D is different from the previously known provitamins D which are chicken-active after activation. Further studies make it reasonably certain that the sterol fraction present in *Modiolus demissus* (Dillwyn) is a mixture of compounds and contains, beside the naturally-occurring provitamin D, sterols and also sterol-like material which cannot be converted by chemical means to a provitamin D. The sterol fraction contains, however, what appears to be two different sterols which can be converted into provitamin D and subsequently into vitamin D.

For practical purposes, the sterol mixture as obtained from the mussel *Modiolus demissus* (Dillwyn) is subjected to a series of activation procedures such as ultra-violet light activations. After exhaustive irradiation the sterol fraction contains approximately 1% of provitamin D as determined spectroscopically. The sterols proper in the remaining mixture are then converted into provitamin D according to any one of the three above-described principles. In order to demonstrate the difference between known provitamins and the new provitamin which has been obtained, the mixture of sterols through their esters, and especially through the acetates and benzoates, has been converted by oxidation into the corresponding 7-keto derivatives. By a single crystallization of the oxidized material it is possible to separate out the mixture of 7-keto-sterol esters from the other sterol-like materials which cannot be converted into provitamin D. For practical purposes and in order to arrive at a low cost chicken-active vitamin D, the mixture of the 7-keto-sterol compounds is then converted into a mixture of the corresponding 7-dehydro sterols by the usual procedures. On the other hand, it is possible to separate the individual compounds and in order to arrive at a pure and single vitamin D it may be desirable to effect such a separation. This separation may be carried out, for example, at the 7-keto-sterol stage. For this purpose the mixture of 7-keto-sterol esters is saponified to yield a mixture of 7-keto sterols. Upon fractional crystallization of the 7-keto sterols it is possible to separate at least two different 7-keto sterol compounds. On the other hand, it may be more convenient to re-esterify the 7-keto sterol mixture to the corresponding 7-keto sterol esters, for example, the acetates, and effect separation by fractional crystallization of the 7-keto sterol esters. Thus, two 7-keto sterol compounds are obtained which have entirely different physical characteristics. One of these 7-keto-sterol acetates when obtained in a relatively high degree of purity has a melting range of approximately 160–161° C., while the other was found to have a melting range of 175–178° C. The latter material may not be 100% pure.

Upon conversion of the 7-keto-sterol acetate or 7-keto-sterol benzoate to the corresponding 7-hydroxy compounds, it has been possible to demonstrate a difference between the two sterols and the corresponding cholesterol derivatives. Details can be found in the following examples, especially Example 2.

The differences between cholesterol and the new sterol compounds can best be illustrated by carbon and hydrogen determinations which indicate beyond any doubt that the compounds are different from each other.

This invention may be more readily understood by a consideration of the following illustrative examples, wherein the quantities are stated in parts by weight:

*Example 1*

100 parts of wool grease were saponified in aqueous alcohol containing 10 parts of alkali by heating to reflux for a period of four hours. The alcohol was then distilled off under vacuum and water was added in an amount equal to that of the alcohol distilled off. The water solution was then extracted with methylene chloride. This extraction can be accomplished by a batch process or in a continuous fashion. The methylene chloride solution was then separated and the methylene chloride was distilled off; the residue was dissolved in hot alcohol and cooled down. Upon cooling, a mixture of sterols and terpenes crystallizes out. This can be recrystallized from organic solvents such as acetone, alcohol, and "Skellysolve." This mixture of sterols and sterol-like materials contains a small amount of provitamin D. This can be established by measuring the ultra-violet absorption spectrum. When this is done in the usual fashion and the extinction coefficients, at 260, 270, 282 and 293.5 m$\mu$, calculated in terms of provitamin D, it is found that the mixture contains approximately 1% of natural provitamin D.

This mixture of sterols, provitamin D, and sterol-like materials is dissolved in peroxide-free ether and the ether solution is irradiated to yield vitamin D in the usual fashion. It is desirable to direct the irradiation procedure so that approximately 40–50% of the provitamin D present in the ether solution is converted into vitamin D. After the irradiation has been completed, the ether is distilled off and the unconverted provitamin D is crystallized out, together with the inactivatable sterols of the sterol-like material (terpenes). It may be necessary to concentrate the mother liquors further in order to achieve an economic recovery of unconverted provitamin D, sterols and sterol-like materials. The final mother liquors contain the vitamin D. A suitable oil such as corn oil is added to the ether solution and the ether is distilled off. The vitamin D is then dissolved in the oil and can be marketed in this form. The vitamin D thus obtained is more than 100% chicken-active.

The provitamin D present in the recovered mixture of sterols and terpenes is again determined spectroscopically. If the amount present is above 0.2% the irradiation is repeated by converting again approximately 40–50% of the provitamin into vitamin D. This irradiation procedure is repeated until the sterol mixture is exhaustively irradiated and contains 0.2% or less of provitamin D. After each one of these irradiations, the vitamin D is worked up as described above into a suitable oil and the unconverted sterols are recovered by crystallization.

The mixture of recovered sterols and sterol-like materials is then acetylated. 100 parts of sterol mixture is added to 500 parts of acetic anhydride and the mixture is heated to reflux for 5 hours. After cooling to room temperature, the mixture of acetates crystallizes out and is filtered off. The acetates are then dissolved in 50 parts of acetic acid and lead tetra-acetate in an amount equal to 2 moles is added. This mixture is kept at 60° C. for a period of 6 hours. At the end of this time the acetic acid is distilled off under vacuum and water is added to the residue. The sterols are extracted from this residue by means of a suitable solvent such as ether, dichloro-ethylene, methylene chloride and the like. The sterols are then recovered from the organic solvents by distilling off the solvent under ordinary temperature. The mixture of sterols is then dissolved in alcohol and saponified by means of potassium hydroxide. This saponification is carried out by heating to reflux for a period of 3 hours. At the end of this time the sterol mixture containing 7-hydroxy-cholesterol is isolated by a suitable process. Half of the alcohol used for the saponification procedure may be distilled off under vacuum and an equal amount of water may be added. This mixture may then be extracted with an organic solvent in order to separate the 7-hydroxy sterols from the water phase. After washing and drying of the solution the organic solvent is distilled off and to the residue pyridine is added until all the sterols and sterol-like materials are dissolved. Benzoyl chloride is then added in an amount sufficient to take care of the hydroxyl groups present in the mixture. The benzoylation reaction may be carried out at room temperature but it is also possible to use elevated temperatures. The mixture of benzoylated sterols and terpenes is then isolated in the usual fashion and crystallized from a solvent such as alcohol. The sterol benzoates are then dissolved in cyclohexane in a ratio of 1 part of sterol benzoates to 20 parts cyclohexane. This mixture is heated at 200° C. under pressure for 2 hours. After cooling, the solvent is recovered by distillation. By adding alcohol to the residue of the distillation, it is possible to isolate a mixture of sterols and terpenes containing 7-dehydro-cholesterol benzoate. This is saponified by means of alcoholic alkali in a manner similar to that described above for the saponification of the oxidized sterol acetates. There is obtained a mixture of sterols and terpenes containing provitamin D. The amount of provitamin D present is determined spectroscopically.

The provitamin D present in the mixture is converted into vitamin D and the latter is separated by the same methods which were described at the beginning of the example. After the mixture of materials has been irradiated exhaustively, there is obtained a mixture of inactivatable sterols and terpenes. The sterols present may be further converted into 7-dehydro-sterols followed by irradiation to vitamin D.

*Example 2*

Freshly gathered mussels of the species *Modiolus demissus* (Dillwyn) are subjected to steam for a period of 5–10 minutes. The meat is then separated from the shell and is saponified with alcoholic potassium hydroxide in an amount of about 1 part of alcohol and 1/10 part of potassium hydroxide for 1 part of mussel meat. The saponification is carried out at refluxing temperature and is continued for a period of from 2–10 hours. After completion of the saponification procedure, water is added in an amount equal to about 2 parts to 1 part of the saponification mass. The mixture is then extracted with an organic solvent such as methylene chloride or diethyl-ether. After extraction the solution is repeatedly washed with water and dried over sodium sulfate and the solvent is removed by distillation. There remains a residue which is dissolved in about 10–20 times its weight of alcohol and the sterol mixture is allowed to crystallize.

The sterol fraction obtained in this manner may be recrystallized from alcohol or from other suitable solvents. If necessary, decolorization may be achieved by means of charcoal or other suitable agents. Finally a white sterol mixture is obtained which is analyzed for its provitamin D content spectroscopically. A provitamin D content of 30% is obtained.

The provitamin D present in the sterol mixture is converted into vitamin D in the following manner: The sterols are dissolved in peroxide-free diethyl-ether and the solution is irradiated with ultra-violet light in a suitable apparatus. Subsequently, the ether is distilled off and the residue is dissolved in hot ethyl alcohol. By refrigerating this solution the unconverted provitamin D together with the bulk of inactivatable sterols crystallizes out and is separated from the mother liquor containing vitamin D by filtration. The filter cake is washed with small amounts of alcohol. The ethyl alcohol filtrate is then concentrated further by distillation in vacuo, followed by refrigeration. An additional crop of sterols crystallizes out and is removed by filtration.

The vitamin D present in the mother liquors can be used as such. On the other hand, ethyl alcohol is not a particularly good vehicle for storing vitamin D and it may be transferred into an oil solution such as described in the previous example or crystalline vitamin D may be obtained by isolation of the vitamin D through the intermediary formation of its 3,5-dinitro-benzoate.

The mixture of recovered sterols is again subjected to a process of irradiation and the unconverted provitamin D is again recovered together with the inactivatable sterols as described above. In this manner the sterol mixture isolated from the mussels of the genus *Modiolus demissus* (Dillwyn) are irradiated exhaustively. After each recovery of sterol mixture, the provitamin D content is determined spectroscopically, until it is no longer economically feasible to produce vitamin D by further irradiation.

The mixture of sterols obtained after exhaustive irradiation is acetylated in the following manner: 100 parts of the sterol showing a melting range of 142–144.5° C. are dissolved in 230 parts of acetic acid and 120 parts of acetic anhydride are added. The mixture is heated to reflux for 3 hours and while cooling the material is agitated. The sterol acetates crystallize out and are filtered off, washed with methanol and dried in vacuum for 2 hours. The mixture of sterol acetates thus obtained has a melting range of approximately 120–125° C.

755 parts of these sterol acetates are dissolved in 7900 parts of acetic acid. To this solution a solution of 439 parts of chromic acid in 1900 parts of 80% acetic acid is added slowly while agitating and holding the reaction temperature at 54–56° C. After the addition of the chromic acid solution is completed the temperature was held at approximately 55° C. for an additional 4 hours. Then under vacuum about 7000 parts of acetic acid is distilled off and while agitating 2650 parts of methyl alcohol is added. This mixture is allowed to cool. The reaction mixture is cooled down with ice and salt to approximately 0° C. and kept at that temperature for approximately 24 hours. During this time a solid crystallized out which was filtered and washed with cold methanol. After drying, approximately 240 parts of solid crystalline material was obtained. This material has a wide melting range and is finished melting below 150° C. This material consists of a mixture of compounds, but consists mainly of 7-keto-sterol acetates. This mixture may be used directly, without further separation, for the preparation of vitamin D mixture, as will be shown in Example 4. By fractional crystallization, however, for example from alcohol or purified petroleum distillate solvents ("Skellysolve"), it is possible to achieve a partial separation of keto-acetates as will now be described, from which individual vitamins are prepared. If the first crop of each following recrystallization is again recrystallized, there is obtained, after a total of seven recrystallizations, a 7-keto-sterol acetate with a melting range of 161–164° C. On the other hand, the mother liquor of the first recrystallization contains a material which melts, in the crude form, at 132–136° C. The mother liquor from the 4th and 5th recrystallizations contains a material which shows a melting range of 162–169° C. and the mother liquors from the 6th and 7th recrystallization contain a material which melts at 164–169° C. From 240 parts of the crude sterol mixture there was obtained 72 parts of the 7-keto-sterol acetate, M. R. 161–164° C., after 7 recrystallizations. This 7-keto-sterol acetate and other similarly-prepared materials, analyzed as follows:

| C—79.27% | H—10.30% |
|---|---|
| 79.12 | 10.63 |
| 79.12 | 10.55 |
| 79.04 | 10.24 |

Theory values are 79.5% C and 10.33% H for $C_{31}H_{48}O_3$, or 79.05% C and 10.45% H for $C_{29}H_{44}O_3$.

This material is not identical with 7-keto cholesterol acetate which, when analyzed simultaneously with the new material, gave the correct data: C=78.54% and H=10.37% (theory—C=78.70% and H=10.40% for $C_{29}H_{46}O_3$).

The 7-keto-sterol acetate has been converted into its semicarbazone in the following manner: 1.5 parts of the 7-keto-sterol acetate is dissolved in 90 parts of methyl alcohol and a methanolic solution prepared from 3 parts of semicarbazide hydrochloride and 4 ½ parts of sodium acetate is added and heated to reflux for 2 hours. The semicarbazone is then allowed to crystallize out slowly. The semicarbazone is filtered off and recrystallized from chloroform and methanol. It shows a M. R. of 207–210° C. Three different preparations analyzed as follows: N=8.36%; 8.40%; 8.62%. There is obtained from the mother liquors a small amount of additional semicarbazone which analyzed N=7.98%. The theoretical nitrogen values are 8.41% for $C_{30}H_{49}O_3N_3$ and 8.00% for $C_{32}H_{51}O_3N_3$.

The 7-keto-sterol acetates of M. R. 161–164° C. are saponified to yield the free 7-keto-sterol. 65 parts of 7-keto-sterol acetate of M. R. 161–164° C., 12.4 parts of potassium hydroxide and 650 parts of methyl alcohol were mixed and dissolved by gentle heating. The solution was then heated to reflux for 15 minutes. After this the solution was poured on ice and water and extracted with ether. The ether solution was washed three times with distilled water, then dried over sodium sulfate and concentrated on a steam bath. 455 parts of cyclohexane was added and the residual ether was distilled off. The remaining cyclohexane solution was cooled to room temperature whereupon the 7-keto-sterol crystallized; there was obtained 50 parts crude 7-keto-sterol with a M. R. 162–164° C. After five consecutive recrystallizations from cyclohexane and "Skellysolve," 43 parts of 7-keto-sterol, M. R. 166–168° C., were obtained. This material analyzed as follows: (Theoretical values of C and H for $C_{29}H_{46}O_2$ are 81.6% and 10.8%) C=81.45%; H=10.94%. A sample of 7-keto-cholesterol prepared at the same time was found to melt at 172° C. and showed the correct analytical data: C=81.0%; H=11.0% (theory values are 81.0% and 11.0% for $C_{27}H_{44}O_2$).

A reacetylation of the 7-keto-sterol by means of acetic anhydride and pyridine yielded the identical 7-keto-sterol acetate of M. R. 161–164° C.

On the other hand the 7-keto-sterol material which was obtained from the mother liquors from the 6th and 7th recrystallization of the original preparation which was described above to melt at 164–169° C. was saponified in the same manner as described for the 7-keto-sterol acetate of M. R. 161–164° C. There was obtained a 7-keto-sterol of M. R. 162–164° C. which apparently is different from the above-described 7-keto-sterol of M. R. 166–168° C. When this 7-keto-sterol of M. R. 162–164° C. was reacetylated by means of acetic anhydride and pyridine, there was obtained a 7-keto-sterol acetate of M. R. 170–172° C.

The main fraction of the free 7-keto-sterol melting at 166–168° C. was acetylated in the usual manner. There was obtained, from 42 parts of 7-keto-sterol, 34 parts of a 7-keto-sterol acetate melting at 161–164° C. After four additional recrystallizations from "Skellysolve," this material melted at 160–161° C. This material when saponified yielded again the free 7-keto-sterol melting at 166–168° C.; there was obtained from the mother liquor 4.7 parts of a 7-keto-sterol acetate which melted at 172–175° C. Upon recrystallization of this material the melting range was raised to 174–176° C. From the mother liquors of the second recrystallization of the material which melted at 161–164° C., there was obtained some material which melted as high as 177–178° C. It appears from these data that at least two different 7-keto-sterol acetates have been obtained, one of which melts at about 160–161° C. while the other melts at about 176–178° C. The free 7-keto-sterol from the lower melting acetate melts approximately at 168° C. while the free 7-keto-sterol from the higher melting acetate melts at approximately 164° C. In other words the higher melting 7-keto-sterol acetates yield a lower melting 7-keto-sterol. It was also observed that "Skellysolve" is a better solvent for the separation of the isomeric 7-keto-sterol acetates than is alcohol. Curiously enough the higher melting material is more soluble in "Skellysolve" than is the lower melting material. It must also be concluded that in order to obtain pure compounds it is not sufficient as has been thought to recrystallize until a constant melting point is obtained but it is necessary to recrystallize until the mother liquors from the recrystallization yield a product which is identical in melting point with the main product of the crystallization.

In order to convert the 7-keto-sterol acetates into 7-dehydro-sterols it is necessary to reduce them to the corresponding 7-hydroxy sterols. We shall describe first such a conversion of a mixture of the 7-keto sterols and then the reduction of the essentially pure constituents.

27 parts of a mixture of 7-keto-sterol acetates having a M. R. of 155–162° C. was mixed with a solution of aluminum isopropoxide and sodium bicarbonate prepared from 5 parts aluminum, 1 part of mercuric chloride, 1000 parts of anhydrous isopropanol and 10.5 parts of sodium bicarbonate. This mixture was heated slowly to its boiling point and the acetone formed during the reaction was slowly distilled over during a period of 15 hours. After this time no more acetone was evolved indicating that the reduction was complete.

The isopropanol was then distilled off under vacuum and the residue taken up in ether, washed with dilute hydrochloric acid, water, etc. After drying of the ether solution, the ether was distilled off until the 7-hydroxy compound started to come out in the form of a gelatinous mass. This was taken up in 150 parts of pyridine and 55 parts of benzoyl chloride were added slowly while stirring and cooling. The reaction mixture was allowed to stand over night and the 7-hydroxy sterol dibenzoates were then isolated in the usual fashion by ether extraction and purification of the ether solution by means of sodium carbonate and dilute hydrochloric acid solutions. The dibenzoates were then obtained in crystalline form by crystallizing the ether residue from methyl alcohol. They melted at 167–169.5° C. After recrystallization from acetone, a M. R. 169–171° C. was obtained. This material analyzed as follows: C=80.95%; H=8.78% (theory—C=81.1% and H=8.85% for $C_{43}H_{56}O_4$). A sample of the corresponding cholesterol derivative prepared at the same time showed a M. R. of 174–175° C. It analyzed correctly (C=80.6%; H=8.85% are the theoretical values for $C_{41}H_{54}O_4$).

The purified 7-keto-sterol acetate melting at 160–161° C. was reduced in a similar manner. After several recrystallizations of the dibenzoate obtained this melted at 170–172° C. and analyzed C=81.16%; H=8.70%. Saponification value found—182.86. These data indicate again that this material is different from the corresponding cholesterol compound.

The other purified 7-keto-sterol acetate melting at approximately 176° C. (6.5 parts) was reduced with 1.35 parts of aluminum in 286 parts of isopropanol to which 3.5 g. of dimethylaniline had been added. After completion of the reduction, the 7-hydroxy-sterol was isolated and dibenzoylated by means of benzoyl chloride and pyridine. The crude dibenzoate melted at 155–160° C. After six recrystallizations the material showed a M. R. of 174–175° C. This material analyzed: C=80.91%; H=9.04%. Saponification value—183.0.

In order to convert the 7-hydroxy-sterol dibenzoates into 7-dehydro-sterol benzoate, 9.7 parts of the dibenzoate were dissolved in 200 parts of cyclohexane and heated at about 220° C. under pressure for 2½ hours. The solution was then cooled down, extracted with a dilute solution of sodium hydroxide and the solvent was distilled off under vacuum. The 7-dehydro-sterol benzoate crystallized from the residue upon addition of acetone. The material showed a M. R. of 131–135° C. and finally became clear at 172° C. Upon repeating recrystallizations, a M. R. of about 140–181° C. was obtained.

The pure 7-dehydro-sterol is obtained from the 7-dehydro-sterol benzoate by saponification to the crude 7-dehydro-sterol and purification is achieved by conversion of the crude 7-dehydro-sterol into its 3,5-dinitro-benzoate which lends itself admirably to purification by fractional crystallization. The pure 7-dehydro-sterol is then obtained by saponification of the 3,5-dinitro-benzoate: 2.7 parts of 7-dehydro-sterol benzoate, M. R. about 140–181° C., was dissolved in 15 parts of benzene and a solution of potassium hydroxide and methanol was added. This mixture was heated to reflux for a half hour after which time the crude 7-dehydro-sterol was isolated in the usual fashion by drowning in water and extraction with a suitable organic solvent. It is not necessary to pay particular attention to purification of the 7-dehydro-sterol at this stage. Instead, the crude material is converted into its dinitro-benzoate in benzene solution by first adding 5 parts of dry pyridine and then 3 parts of 3,5-dinitro-benzoyl chloride dissolved in dry benzene to the crude material. The 3,5-dinitro-benzoate mixture crystallizes out immediately. It is isolated by filtration and the crude 3,5-dinitro-benzoate shows a M. R. in the order of 190–193° C. It is recrystallized from 50 parts of dry benzene. After repeated recrystallizations the 3,5-dinitro-benzoate of the 7-dehydro-sterol shows a M. R. from 210.5 to 211.5° C.

The pure 7-dehydro-sterol was obtained from the 3,5-dinitro-benzoate by saponification with alkali in alcohol in the usual manner. After two recrystallizations from ethyl alcohol the compound had a M. R. of 149–150.5° C. The following analytical data were obtained: C=84.78%; H=11.44%.

The 7-dehydro-sterol is relatively unstable on storage under ordinary conditions. Its stability can be improved considerably by adding to it sterols such as cholesterol, or the inactivatable sterols from mussels of the species *Modiolus demissus* (Dillwyn), phytosterols and/or sterol-like materials such as tri-terpenes. For an efficient conversion of the provitamin D into vitamin D, the pure provitamin D is mixed with an equal amount of a sterol such as cholesterol. 2.8 parts of this sterol mixture was dissolved in 1250 parts of ether which was freshly distilled over sodium. The solution was subjected to irradiation with ultra-violet light according to the well known procedure. Accordingly approximately 40–50% of the provitamin originally present was converted. After completion of the irradiation, the ether was distilled off and from the residue the unchanged provitamin D together with the cholesterol was crystallized by means of alcohol. The crystals were filtered off from the mother liquors which contained the vitamin D. Corn oil was added to these mother liquors and the alcohol distilled off under vacuum leaving the vitamin D dissolved in oil.

This vitamin D has been obtained in very high yield as tested on rats and the ratio of the activity found on rats when compared with the activity on chicks indicated that the new vitamin D has a chicken activity of 110–120% of the activity of the U. S. P. reference cod liver oil. The recovered provitamin D is again converted into vitamin D by adding additional quantities of the pure provitamin D to the sterol mixture thus increasing the provitamin D content to approximately 50%.

*Example 3*

The crude sterol fraction was isolated from *Modiolus demissus* (Dillwyn) essentially according to the procedure described in Example 2 and the provitamin D present in the mixture was converted into vitamin D by irradiating the sterol mixture exhaustively in ether solution. The remaining mixture of sterols, part of which can be converted into vitamin D by chemical conversion into the provitamin D followed by activation to vitamin D, can be separated into its components by using the technique of the chromatographic absorption analysis. For this purpose 5 parts of the sterol mixture was acetylated by means of acetic anhydride as described in Example 2. 5 parts of the sterol acetate mixture was dissolved in 500 parts of petroleum ether and run through a column of activated aluminum oxide. The sterols were eluted from the column by adding a small amount of alcohol to the petroleum ether. By continuously running this solvent mixture through the column and by collecting separately each 50 parts of solvent the original 5 parts of sterol acetate was separated into a total of 24 fractions. It was evident that considerable purification of individual members had been achieved. Thus, for example, the 5th sterol acetate-containing fraction yielded sterol acetates which showed a M. R. of 115–134° C.; the 17th fraction yielded sterol acetates melting at 124–136° C. Yet when mixed the mixture melted between 100–115° C.

It was found relatively easy to determine the suitability of the sterols obtained for conversion into 7-dehydro-sterols. For this purpose the sterol acetate fraction was dissolved in chloroform and benzoyl peroxide was added. The mixture was heated to reflux for a half hour after which time the solvent was distilled off and the residue was dissolved in alcohol and saponified with potassium hydroxide. This material contains 7-hydroxy-sterol if the initial sterol lends itself to conversion to a 7-dehydro-sterol. The 7-hydroxy sterol-containing fraction is isolated and benzoylated by means of benzoyl chloride and pyridine. The benzoates are heated with dimethyl-aniline for 2 hours to reflux after which the dimethyl-aniline is removed by extracting the sterols with ether and the dimethyl-aniline with dilute hydrochloric acid. After saponification of the sterol ester a solution of a sterol mixture is obtained which is examined spectroscopically for its provitamin D content. If the initial sterol used for the oxidation is suitable for conversion into a provitamin D the typical ultra-violet absorption characteristics of provitamin D are easily detected in the solution.

*Example 4*

The mixture of sterols as obtained after exhaustive irradiation of the sterol fraction isolated from the mussel of the species *Modiolus demissus* (Dillwyn) is converted into the benzoate ester by mixing 1 part of the sterols with 1 part of benzoic anhydride and adding 5 parts of benzene. This mixture is heated to reflux for 2 hours. Upon cooling the benzoic acid ester crystallizes out.

The sterol benzoates are converted into the 7-keto-benzoates by chromic acid oxidation as described for the acetates in Example 2. The 7-keto-sterol benzoates were found to melt at 159–161° C. to a cloudy liquid which became clear at 175° C. It analyzed C=81.50%; H=9.16%. This compares with the following data for the corresponding cholesterol compound: M. R. 161–181° C.; C=81.0%; H=9.55%.

50 parts of the 7-keto-sterol benzoate is dissolved in dry isopropanol and 1.5 moles of aluminum isopropoxide is added together with a small amount (0.1 mole) of dimethyl-aniline. After heating for about 5 hours to the boiling point the isopropanol and the acetone formed during the reaction are distilled off and the residue is extracted with ether and water. The ether solution contains the 7-hydroxy-sterol-3-mono-benzoate which is isolated by distilling off the ether. It can be recrystallized from ether or acetone. It shows a M. R. of 189–193° C. Two different samples analyzed as follows:

C=81.12%   H=9.92%
  80.81       9.88

The 7-hydroxy-3-mono-benzoate is converted into 7-dehydro-benzoate by heating to reflux for 3 hours with copper sulfate in toluene. After decanting from the copper sulfate, the toluene is distilled off under vacuum. The free 7-dehydro-sterol is then obtained by saponification of the benzoate in the usual fashion. Irradiation of the provitamin D obtained yielded a vitamin D which showed a chicken activity of about 120% of that of the U. S. P. reference cod liver oil.

*Example 5*

The mixture of sterols as obtained after the exhaustive irradiation of the sterol mixture isolated from *Modiolus demissus* (Dillwyn) was dissolved in acetic acid and a corresponding amount of mercuric acetate was added. The mixture was heated to 50° C. for a period of 5 hours. The sterols were then isolated by pouring the reaction mixture in water followed by extraction with methylene chloride. The solvent is then distilled off and the residue taken up in alcohol. To this is added a small amount of potassium hydroxide and the mixture is heated to reflux for 1 hour. The sterols are then isolated in the usual fashion and show a provitamin D content which is appreciably higher than that of the starting material. The mixture is then dissolved in dioxane and antirachitically activated with ultra-violet light. There results a vitamin D solution which is as active when tested on chicken as is activated 7-dehydro-cholesterol.

*Example 6*

30 parts of sea mussels of the species *Mytilus edulis* are washed, steamed, drained and crushed. The crackings are mixed with 20 parts of 15% aqueous caustic solution. The temperature of the caustic is then raised to 95° C. for a half hour. After this time the meat of the mussels is completely saponified and only the shells remained. These are filtered off and another 30 parts of cracked, whole mussels are added. The shells, after being stripped of the meat, are washed with water and the wash water is used for the preparation of the next 15% caustic solution. In this fashion a dozen batches of crackings are worked up in the same saponification liquor. The aqueous solution is then held at 95° C. for an additional 2 hours after which time the saponification liquor is cooled and extracted twice with a solvent such as ethyl ether in the proportion of 3 parts of caustic liquor to 1 part of ether. The combined ether extracts are washed with water and the ether removed by distillation. The unsaponifiable material is obtained as an oily solid which is dissolved in 10 parts of hot alcohol. On cooling the sterol mixture which contains the provitamin D crystallizes in white crystals. If necessary the mixture may be purified by means of recrystallization and decolorization with charcoal or animal black. Spectroscopic assay indicates that this material contains approximately 12% of provitamin D.

The sterol mixture is dissolved in peroxide-free ether and is irradiated to yield vitamin D in the usual fashion. The unconverted provitamin D is isolated together with the other sterols. After a series of such irradiations of the same material it will have been exhaustively irradiated. 100 parts of the remaining sterols which now contain only traces of provitamin D are acetylated in the usual fashion with acetic anhydride. The sterol acetate mixture showed a M. R. of 117–130.5° C. The sterol acetates obtained in another experiment showed a M. R. of 101–114° C.

Each one of these sterol acetate fractions has been oxidized to the corresponding 7-keto-sterol acetates in a manner similar to that described in Example 2. From the first sterol acetate material, M. R. 117–130.5° C., a 7-keto-sterol-acetate material was obtained with a M. R. from 144–160° C. On the other hand, from the second batch of sterol acetates, M. R. 101–114° C., a 7-keto-sterol acetate material was obtained with a M. R. from 144–150° C. Each one of these 7-keto-sterol acetate materials was then subjected to fractional crystallization from alcohol. This fractionation indicated that the 7-keto-sterol acetate material is a mixture of at least two different compounds. The material from the first experiment analyzed C=78.47%; H=10.56%, whereas the material from the second experiment analyzed C=78.38%; H=10.28%. The 7-keto-sterol acetates in the crude form were then subjected to selective reduction to yield the corresponding 7-hydroxy-sterol compounds which were converted into the 7-dehydro-sterol compounds by the usual technique, such as described in Example 2. Irradiation of this material yielded vitamin D.

Example 7

Oysters of the species *Ostrea virginica* were saponified after being minced in a meat chopper by means of alcoholic alkali. The unsaponified material was then isolated in the usual manner and from this the mixture of sterols crystallized by means of 95% ethyl alcohol. According to a spectroscopic analysis the sterol mixture contained approximately 8% provitamin D. This provitamin D was converted into vitamin D by ultra-violet irradiation and the recovered sterol mixture was twice again irradiated. The sterols which were then recovered showed a provitamin D content of only .5%. This mixture was converted into the corresponding acetates by means of acetic anhydride. The crude acetate had a M. R. of 129-135° C. Upon recrystallization the first crop showed a M. R. of 126-134° C. while the second fraction showed a M. R. of 132-137° C. From the mother liquor a material melting from 100-118° C. was obtained. All these fractions were combined and heated with benzoyl peroxide in chloroform solution at the boiling point for 3 hours. After cooling, the chloroform solution was washed neutral with alkali, and the chloroform distilled off. The residue was saponified with alcoholic potassium hydroxide and the sterols isolated by ether extraction. The sterol mixture was then converted into its benzoates by dissolving the sterols in pyridine and adding benzoyl chloride. The resulting sterol benzoates were then heated in dimethyl-aniline to 200° C. for a period of 3 hours after which time the dimethyl-aniline was removed by vacuum distillation. The residue was saponified with alcoholic sodium hydroxide and the sterols isolated through an ether extraction. The ether extract was subjected to an antirachitic activation by means of ultra-violet irradiation. By this method vitamin D was obtained.

Example 8

The unsaponifiable part of sea anemones, obtained from freshly gathered animals by caustic saponification, is dissolved in anhydrous ether and subjected to ultra-violet irradiation. The vitamin D thus formed is separated from the remaining sterols by crystallization of the sterols. These sterols proved to be almost free from any provitamin D as determined spectroscopically. They were converted into the corresponding acetates by means of pyridine and acetyl chloride and crystallized from alcohol. 20 parts of this sterol acetate mixture was mixed with 4 parts of benzoquinone in a reaction tube which was evacuated and sealed under vacuum. The tube was then heated to 120-130° C. for 6 hours, cooled, opened and the contents extracted with ether. The ethereal solution was extracted with a solution of sodium hydrosulfite and with dilute alkali and dried over sodium sulfate. The sterol mixture was then isolated by distilling off the ether at a reduced pressure. This material was then saponified and the provitamin D determined spectroscopically. The provitamin D thus obtained was converted into vitamin D by irradiation in ethyl ether solution with ultra-violet light.

Example 9

2 parts of periwinkles of the species *Littorina littorea* were crushed together with their shells, whereupon the mass was extracted repeatedly with 2 parts of alcohol. After dilution with water the alcoholic solution was extracted with petroleum ether. The petroleum ether solution was then washed with water and dried over sodium sulfate and evaporated. There remained a fatty material which was saponified by heating it for 2 hours under reflux with a solution of potassium hydroxide in alcohol. The soap solution obtained was diluted with 4 times its volume of water and the unsaponifiable fraction isolated by means of an ether extraction. By crystallization from alcohol the sterols were separated from the remaining unsaponifiable material. The absorption spectrum showed that these crystals contained 26% provitamin D.

The provitamin D in this mixture is converted into vitamin D by subjecting the sterols to an electrodeless discharge activation under vacuum in the vapor phase. The vitamin D is then separated from the unconverted provitamin D and the other sterols by means of a crystallization from alcohol. The recovered sterol mixture is again subjected to an activation treatment. After a number of such treatments essentially all the provitamin D has been transferred into vitamin D.

The remaining sterols are benzoylated by means of benzoyl chloride and pyridine. 1 part of the sterol benzoate mixture is then dissolved in 1 part of dry benzene and 2 parts of lead tetra benzoate are added while stirring. The mixture is heated to reflux for 2 hours while 7-hydroxy-sterol dibenzoates are formed. The benzene solution is washed with water, the benzene distilled off, and the residual sterols crystallized from ether-methanol. From this dibenzoate mixture, benzoic acid is removed selectively by heating with dimethylaniline for two hours. The 7-dehydro-sterol-benzoate obtained is converted into the free 7-dehydro-sterol by saponifying the ester with an alcoholic potassium hydroxide solution after the manner described in the previous example. The 7-dehydro- material is converted into vitamin D by ultra-violet irradiation in ether solution.

Example 10

The unsaponifiable part of sponges as obtained from a sponge fishery house was resaponified with sodium hydroxide and methyl alcohol and the sterols were isolated in the usual fashion. A spectroscopic examination of the sterols thus obtained indicated a provitamin D content of approximately 2%. This material was irradiated with ultra-violet light in ethyl ether solution. By crystallization from methyl alcohol the sterols were separated from the vitamin D formed. The sterols were then converted to the keto-sterol acetates by the method described in Example 2. The keto-acetates were dissolved in hot isopropanol and aluminum isopropoxide was added. The mixture was heated to reflux and after several hours the mixture of isopropanol and acetone formed was slowly distilled over. After no further acetone was evolved the remaining isopropanol was distilled off under vacuum. The residue was dissolved in ether and dilute hydrochloric acid. The ether solution was separated, washed neutral and dried. After evaporation of the ether the residue was dissolved in pyridine and benzoyl chloride was added. After standing over a period of 10 hours at room temperature methyl alcohol was added until the sterol benzoates crystallized out while stirring and while maintaining the temperature at approximately 5° C. The sterol benzoates were isolated by filtration and washed with methyl alcohol. They were then dissolved in tetralin to which a small amount of sodium bicarbonate was added. This solution was heated to reflux for a period of 4 hours, after which the tetralin was distilled off under vacuum. The residue was dissolved in alcohol; filtered and saponified with a 10% alcoholic caustic solution. In this manner 7-dehydro-sterols were obtained which yielded vitamin D, after the usual activation by means of ultra-violet light.

*Example 11*

The fat from corals, obtained as a by-product of the coral fishery industry, was saponified and the sterols isolated in the usual manner. The sterol fraction was dissolved in ethyl alcohol and examined spectroscopically. It contained approximately 1% of provitamin D. This was converted into vitamin D by ultra-violet irradiation. The greater part of the alcohol was then distilled off and the sterols crystallized out from the remaining alcohol. By filtration the crystalline sterols, now essentially devoid of provitamin D, were separated from the alcoholic solution of vitamin D. The crystalline sterols were acetylated by means of acetic anhydride. 1 part of the sterol acetate obtained was dissolved in 20 parts of glacial acetic acid and 1.12 parts of lead tetra acetate were added while vigorously stirring and keeping the temperature at 60° C. After several hours the oxidation is completed and the material is poured on ice and water and extracted with ether. The ether solution is washed neutral and added to a solution of .5 part of potassium hydroxide in 10 parts of ethyl alcohol. The ether is distilled off and the remaining alcoholic liquid is heated to reflux for 1 hour. After cooling, the saponification mass is extracted with ether and washed neutral. After drying over sodium sulfate the ether is distilled off and the residue is benzoylated with benzoyl chloride in pyridine solution. After working up the reaction mass a crystalline product is obtained which contains 7-hydroxy-sterol-dibenzoate. This material is dissolved in 5 parts of diethyl aniline and heated to reflux for 3 hours in an atmosphere of nitrogen. The diethyl aniline is then distilled off under reduced pressure. Upon addition of acetone to the residue the 7-dehydro-sterol benzoate crystallizes out. It is filtered off and saponified with 5% ethyl alcoholic caustic potash by heating the solution to the boiling point for one hour. The resulting 7-dehydro-sterol is isolated through an ether extracation and the ether solution is irradiated in ultra-violet light to yield vitamin D.

In a similar manner Tubifex worms were saponified and vitamin D was obtained from the natural provitamin and from the provitamin which was obtained from the inactivatable sterols by chemical conversion into provitamin D.

*Example 12*

100 parts of horseshoe crabs were saponified with alcoholic KOH under pressure. After adding water to the saponification mass the sterols were isolated by extraction with methylene chloride. A spectroscopic examination revealed the presence of provitamin D which was converted into vitamin D by ultra-violet irradiation. The remaining sterols which were now found to be essentially free of provitamin D were dissolved in carbon tetrachloride in a ratio of 1 part of sterol to 10 parts of carbon tetrachloride, and 1 part of benzoyl peroxide was added. The mixture was heated to reflux for 3 hours. After the completion of this reaction the solution was extracted with an aqueous solution of sodium hydroxide. The carbon tetrachloride was then distilled off and the residual sterol compound was saponified with alcoholic potassium hydroxide. The 7-hydroxy-sterol compound was isolated from the saponification mass by extraction with an organic solvent and was benzoylated to yield 7-hydoxy-sterol dibenzoate. The latter was dissolved in dioxane and heated in a sealed system to 200° C. for 2 hours. After saponification of the reaction product with alcoholic potash a 7-dehydro-sterol compound was obtained. When this was dissolved in diethyl ether and subjected to ultra-violet irradiation, vitamin D was obtained.

In a similar manner vitamin D was obtained from Sea Urchins and Starfish.

It is to be understood that the foregoing examples are representative merely of a few of the many practical embodiments of this invention. They may be varied widely with respect to the individual reactants; the proportions thereof, and the conditions of reaction without departing from the scope of the invention.

In place of the mixtures of sterols and/or sterol-like compounds referred to in the examples, other similar mixtures may be substituted. In the same manner, these mixtures may be added to one another and reacted upon as set out heretofore. As a general rule, it may be stated that the mixtures of sterols and/or sterol-like materials are preferably derived from invertebrate sources. These materials contain sterols or sterol-like materials which may be converted to new and valuable provitamins D by the described processes or their chemical equivalents. The resulting provitamins D, upon suitable anti-rachitic activation, are converted to new vitamins D which are surprisingly effective on chickens.

Before converting the raw materials in the manner described heretofore it is generally advisable to remove therefrom the desirable provitamin D with which they may be associated in nature. This may be accomplished in the manner set out in the examples or in any other suitable manner.

The precise mechanism of this invention is not fully understood. It appears, however, that contrary to the widely held opinion of people familiar with this field, valuable provitamins D may be produced synthetically by starting from a material which is not in the pure state—in other words, one need not commence with substantially pure cholesterol, sitosterol or stigmasterol, as was formerly considered to be essential. On the contrary, it appears that the material may be entirely lacking in any of these constituents. Furthermore, the presence of a mixture of sterols actually appears to facilitate the reaction and increase the yields of desirable provitamins D. One might theorize that some of the naturally occurring sterols or sterol-like compounds which are present in these mixtures exert a catalytic effect upon the desired reaction, thereby increasing the yield of provitamins D and reducing the yield of undesirable by-products.

By means of this invention an entirely new class of provitamins D and vitamins D has been produced. These valuable substances have been produced from materials which formerly were considered to be worthless and to present merely a problem in disposal. These products are produced without the expensive and time-consuming operations which were heretofore considered necessary in order that the raw material might be purified preliminary to reaction. The resulting vitamins D have a surprisingly high effectiveness on poultry.

As many widely different embodiments of this invention may be made without departing from the spirit and scope hereof, it is to be understood that the invention is not limited to the specific embodiments hereof except as defined in the appended claims.

I claim:

1. A process for obtaining new provitamins D which comprises esterifying a mixture of sterols obtained from mussels, from which mixture substantially all of the provitamin D has been removed, oxidizing the resulting esters to produce 7-keto sterol esters, reducing the resulting 7-keto sterol esters to produce 7-hydroxy sterol esters, dehydrating the 7-hydroxy sterol esters to produce 7-dehydro sterol esters, and saponifying the resulting 7-dehydro sterol esters to produce the antirachitically activatable provitamins D.

2. A process for obtaining new provitamins D which comprises esterifying a mixture of sterols obtained from mussels of the species *Modiolus demissus* (Dillwyn), from which mixture substantially all of the provitamin D has been removed, oxidizing the resulting esters to produce 7-keto sterol esters, reducing the resulting 7-keto sterol esters to produce 7-hydroxy sterol esters, dehydrating the 7-hydroxy sterol esters to produce 7-dehydro sterol esters, and saponifying the resulting 7-dehydro sterol esters to produce the antirachitically activatable provitamins D.

3. A chemical substance of the provitamin D family being distinguished from other provitamins D by being obtained from a natural sterol contained in the saponified fat of *Modiolus demissus* (Dillwyn) from which sterol its natural provitamin D content has been removed, and which sterol yields an acetate which melts in the range of 120 to 125° C.; said substance of the provitamin D family being further characterized by a melting point of 149 to 150.5° C. and by producing upon irradiation a chicken-active vitamin D having an index of activity between 110–120% compared to U. S. P. Reference cod liver oil.

HANS R. ROSENBERG.

REFERENCES CITED

The following references are of record in the file of this patent:

UNITED STATES PATENTS

| Number | Name | Date |
|---|---|---|
| 2,098,984 | Windaus | Nov. 16, 1937 |
| 2,099,550 | Windaus | Nov. 16, 1937 |
| 2,163,659 | Boer | June 27, 1939 |
| 2,260,085 | Milas | Oct. 21, 1941 |
| 2,302,828 | Yoder | Nov. 24, 1942 |
| 2,360,996 | Windaus | Oct. 24, 1944 |
| 2,386,635 | Rosenberg | Oct. 9, 1945 |